US012267938B2

(12) United States Patent
Jacob et al.

(10) Patent No.: US 12,267,938 B2
(45) Date of Patent: Apr. 1, 2025

(54) SELF-BAKING ELECTRODE

(71) Applicant: FERROPEM, Chambery (FR)

(72) Inventors: Philippe Jacob, Menthon-Saint-Bernard (FR); Damien Berthollet, Merlas (FR); Pierre-Henri Morin, Annecy (FR)

(73) Assignee: FERROPEM, Chambery (FR)

( * ) Notice: Subject to any disclaimer, the term of this patent is extended or adjusted under 35 U.S.C. 154(b) by 780 days.

(21) Appl. No.: 17/469,475

(22) Filed: Sep. 8, 2021

(65) Prior Publication Data

US 2021/0410242 A1 Dec. 30, 2021

Related U.S. Application Data

(63) Continuation of application No. PCT/FR2020/050429, filed on Mar. 4, 2020.

(30) Foreign Application Priority Data

Mar. 8, 2019 (FR) ..................................... 19/02394

(51) Int. Cl.
*H05B 7/09* (2006.01)
*H05B 7/10* (2006.01)
(Continued)

(52) U.S. Cl.
CPC ............... *H05B 7/09* (2013.01); *H05B 7/107* (2013.01); *F27B 3/085* (2013.01); *H05B 2203/017* (2013.01)

(58) Field of Classification Search
CPC ... A61K 31/557; A61K 31/5575; A61P 27/06; F27B 3/085; H05B 2203/017; H05B 7/09; H05B 7/107
(Continued)

(56) References Cited

U.S. PATENT DOCUMENTS 4,575,856 A 3/1986 Persson
4,692,929 A * 9/1987 Cavigli .................... H05B 7/09 373/89
9,131,538 B2 * 9/2015 Ferrari ..................... H05B 7/09

FOREIGN PATENT DOCUMENTS

FR 647208 11/1928
FR 2654501 5/1991
(Continued)

OTHER PUBLICATIONS

Translation of FR2797739B1, "Device composite assembly of electrode has self-cooking for fourelectrique has arc", Sep. 12, 2001, By ProQuest. (Year: 2001).*
(Continued)

*Primary Examiner* — Quang T Van
(74) *Attorney, Agent, or Firm* — Burris Law, PLLC

(57) ABSTRACT

A self-baking electrode includes a cylindrical shroud having a longitudinal central axis A. The shroud is made of an electrically-conductive material and disposed vertically on top of a vat of the furnace over one length of the self-baking electrode. The electrode includes a central column disposed within the shroud, substantially aligned on the longitudinal axis A. The central column is suspended from a device independent of the shroud such that the central column is adapted to slip in vertical translation within the shroud and a crude carbonaceous paste disposed around the central column in a top portion of the shroud. The paste is softened and baked under an effect of heat into a stiff carbonaceous paste sticking to the central column in a bottom portion of the shroud. The central column includes a series of electrically-conductive carbonaceous elongate elements. The carbonaceous elongate elements are flexible.

15 Claims, 4 Drawing Sheets

(51) Int. Cl.
*H05B 7/107* (2006.01)
*F27B 3/08* (2006.01)

(58) Field of Classification Search
USPC ...... 373/89, 90, 91, 92, 93, 94, 97, 98, 100; 204/225, 288.2, 294
See application file for complete search history.

(56) References Cited

FOREIGN PATENT DOCUMENTS

| | | |
|---|---|---|
| FR | 2797739 | 2/2001 |
| WO | 2019233549 | 12/2019 |

OTHER PUBLICATIONS

International Search Report for International Application PCT/FR2020/050429, mailed Aug. 12, 2020.

* cited by examiner

SELF-BAKING ELECTRODE

CROSS-REFERENCE TO RELATED APPLICATIONS

This application is a continuation of International Application No. PCT/FR2020/050429 filed on Mar. 4, 2020, which claims priority to and the benefit of FR 19/02394 filed on Mar. 8, 2019. The disclosures of the above applications are incorporated herein by reference.

FIELD

The present disclosure relates to a self-baking composite electrode intended to be used in an electric arc furnace for the production of metals such as metallurgical silicon or ferroalloys.

BACKGROUND

The statements in this section merely provide background information related to the present disclosure and may not constitute prior art.

An electric arc furnace is in the form of a vat made of a refractory material into which metal oxides are loaded. The furnace comprises a fume hood, through which one or several carbon electrode(s) pass(es), each electrode generally having the shape of a cylindrical bar and being disposed vertically, so that the upper end of the electrode is located outside the furnace while its lower end is located in the furnace opposite the metal oxides load.

The principle of the electric arc furnace consists in powering up the electrodes and using the thermal energy of the electric arc established in this manner between the carbon electrodes and the metal in the vat to obtain a temperature high enough for the obtainment of metal by carbothermic reduction of the metallic oxides. The carbon dioxide produced by the reaction of the carbon brought in by the reducers of the load and by the electrode itself with the oxygen of the metallic oxides is sucked in by the chimneys of the fume hood, and the molten metal concentrates in a liquid layer at the bottom of the vat, from which it is discharged through an overflow system.

As it arises from the description hereinabove, the operation of such a furnace for the production of metals implies the consumption of the carbon forming the electrodes, and therefore the consumption of the electrodes themselves.

To overcome this problem, self-baking electrodes, also called Soderberg electrodes, in the name of their inventor, are used.

The principle of the self-baking electrode consists in feeding the electrode made of a carbonaceous material at the level of its upper end as its lower end is consumed in the furnace, in order not to have to change the electrode and produce the metal continuously. The carbonaceous material introduced at the level of the upper end of the electrode is in the form of a non-conductive carbon-based crude, that is to say not baked, paste. As it descends in the electrode, this paste is progressively heated and baked. It is transformed into a conductive stiff paste. Thus, the lower end of the electrode is in the form of a carbonaceous stiff paste that is conductive and therefore able to generate the desired electric arch with the metal present in the vat.

To do so, the first self-baking electrodes generally comprised a cylindrical external sheath, such as a steel-made shroud, within which the carbonaceous crude paste was introduced. The steel-made shroud included inner radial fins for supporting the baked portion of the carbonaceous paste in the bottom portion of the electrode. Nonetheless, the bottom of the shroud dissolved in the molten metal bath and introduced iron therein, which was not desirable, in particular when producing a metal like silicon.

To avoid contamination of the molten metal bath by iron, several solutions have been suggested, all consisting in mechanically detaching the baked portion of the electrode from the steel-made shroud, so that the electrode could be slipped downwards within the shroud, the lower end of the baked portion of the electrode being displaced in this manner in the direction of the molten metal bath, while the shroud remains immovable, away from the bath.

In this perspective, it has been suggested to use a finless smooth shroud. Nonetheless, in such a configuration, the weight of the baked portion of the electrode shall be supported other than by the fins of the shroud. In general, the mounting used to suspend the baked portion is a part inserted into the paste during baking and is consumed at the same time as the electrode at the bottom portion.

Thus, in more recent electrodes of the prior art, a hard core in the form of a central column constituted by pre-baked carbon elements or graphite is disposed within the shroud. The central column is suspended to a support independent of the shroud, so that the weight of this column is not supported by the shroud. The crude carbonaceous paste is disposed within the shroud around the central column in the top portion of the electrode. As the crude paste is descended in the shroud and baked, it sticks to the pre-baked carbon or graphite elements so as to form the stiff paste at the bottom portion of the electrode.

In such electrodes, the pre-baked carbon or graphite elements may, in one form, be assembled to one another by means of double conical threaded fittings, also called nipples, as described in U.S. Pat. No. 4,575,856. Moreover, the support to which the central column is suspended may include a device allowing adding a new pre-baked carbon element at the top of the central column when a pre-baked carbon element at the bottom of the column has been consumed.

Thus, these electrodes allow producing iron-free metals. Nonetheless, the presence of the pre-baked carbon elements assembled together by means of nipples confers a determined stiffness on the central column.

Yet, for the production of some metals, such as for example silicon, and/or when several electrodes are used, such as for example three electrodes, it is recommended to use a furnace provided with a rotary vat in order to avoid an irregular wearing of the latter. The rotation of the vat of the electric furnace and the regulating movements of the electrodes induce lateral forces of the load of the vat on the lower end of the electrodes. These forces translate into a bending of the suspended central column which might cause the break-up of the latter.

The break-up of the central column of a self-baking electrode is not desirable, regardless of the location where this break-up takes place along this column. In the case where the central column breaks up in the bottom portion of the electrode, where the carbonaceous paste is stiff, the furnace must be stopped to lengthen the electrode. The production of the metal is interrupted and the metal is temporarily polluted by the iron brought in by the shroud which must also be partially renewed in this case. Hence, the productivity of the furnace is reduced and the quality of the produced metal is altered.

In the case where the central column breaks up in the top portion of the electrode, where the carbonaceous paste is liquid or soft, the situation is even more difficult because the electrode column is emptied in the furnace thereby inducing a serious disruption. The column should then be reconstituted in its entirety. During the reconstitution phase, the productivity of the furnace and the quality of the produced metal are considerably altered.

SUMMARY

This section provides a general summary of the disclosure and is not a comprehensive disclosure of its full scope or all of its features.

The present disclosure relates to a self-baking electrode for an electric arc furnace, said electrode comprising:

- a substantially cylindrical shroud comprising a longitudinal central axis A, an open upper end and an open lower end, said shroud being made of an electrically-conductive material and being intended to be disposed vertically on top of a vat of the furnace over substantially one length of the electrode,
- a central column disposed within the shroud, substantially aligned on the longitudinal axis A, said central column being adapted to be suspended to a device independent of said shroud such that said central column is adapted to slip in vertical translation within the shroud, and
- a crude carbonaceous paste disposed around the central column in a top portion of said shroud, said paste being configured to soften and then bake under the effect of heat into a stiff carbonaceous paste sticking to the central column in a bottom portion of said shroud,
- where said central column comprises a series of electrically-conductive carbonaceous elongate elements, said carbonaceous elongate elements being flexible.

In the context of the present disclosure, by “flexible carbonaceous elongate element”, it should be understood that the carbonaceous elongate element has a flexibility making it able to fold over itself by a determined amount in a plane containing its longitudinal axis, in one form according to a circle arc having a radius of curvature smaller than or equal to 5 cm. Thus, under the effect of a lateral load applied at its ends, each carbonaceous elongate element could be brought to bend without breaking up.

The flexible nature of the carbonaceous elongate elements confers on the central column of the electrode according to the present disclosure a flexibility enabling it to be subjected to lateral forces in its bottom portion without the risk of this column breaking up. Indeed, when the rotation of the vat of the furnace generates lateral forces applying on the lower end of the central column, the flexible nature of the carbonaceous elongate elements enables these to absorb these forces by curving and bending over themselves slightly, while these forces are absorbed, without causing break-up of the column.

In one form, each carbonaceous elongate element is connected to an adjacent carbonaceous elongate element by an electrically-conductive connecting element configured to enable the deflection of said carbonaceous elongate element with respect to said longitudinal axis A by an angle that could range from −10° to +10°.

The presence of connecting elements configured to enable the deflection of the carbonaceous elongate elements with respect to the longitudinal axis A confers more flexibility on the central column of the electrode according to the present disclosure. Indeed, when the rotation of the vat of the furnace generates lateral forces applying on the lower end of the central column, not only each carbonaceous elongate element could be brought to bend without breaking up, as described hereinabove, but the presence of the connecting elements of the column could also enable each carbonaceous elongate element to deflect with respect to the longitudinal axis A of the column, thereby conferring an additional flexibility on the column contributing to the overall ability of the column to bend without breaking up.

Moreover, the connecting elements of the central column of the electrode according to the present disclosure also enable each carbonaceous elongate element to be inclined with respect to each of the carbonaceous elongate element adjacent thereto.

Thus, the central column of the electrode according to the present disclosure is provided with a flexibility enabling it to bend and deflect with respect to the longitudinal axis A at several points over the length of said column. Thus, the risks of break-up of the central column, both at the bottom portion of the electrode, where the carbonaceous paste is stiff, and at the top portion of the electrode, where the carbonaceous paste is soft, are significantly reduced.

In one form, each carbonaceous elongate element being in the form of a flexible elongate ring, each connecting element comprises a solid part, said solid part being provided with:

- a first convex surface adapted to receive the inner curved surface of an end of a first flexible elongate ring,
- a second convex surface adapted to receive the inner curved surface of an end of a second flexible elongate ring, adjacent to said first flexible elongate ring.

The first and second convex surfaces are disposed opposite one another, such that the plane in which lies the inner curved surface of the end of said first flexible elongate ring is substantially perpendicular to the plane in which lies the inner curved surface of the end of said second flexible elongate ring.

In one form, the first convex surface is in the form of a portion of a half-cylinder and said second convex surface is also in the form of a portion of a half-cylinder, the first convex surface and the second convex surface being disposed with respect to one another such that the plane perpendicular to the longitudinal axis of the half-cylinder from which the first convex surface projects is perpendicular to the plane perpendicular to the longitudinal axis of the half-cylinder from which the second convex surface projects.

Thus, each flexible elongate ring is securely connected to each of the adjacent flexible elongate rings. Moreover, the softness or flexibility, of each ring contributes to the overall flexibility of the central column, whose ability to bend without breaking up under the effect of the lateral forces exerted on its lower end, is thus reinforced.

The carbonaceous elongate elements may consist of flexible elongate rings made of a textile material. In one form, the flexible elongate rings may be manufactured from straps made of a textile material. In one form, the flexible elongate rings have a tensile strength that is high enough to withstand weights that could range from 1 to 40 tons, at temperatures higher than 2000° C.

In one form, the textile material may be formed by carbon fibers.

The particular arrangement of the first and second convex surfaces of the solid parts forming the connecting elements allows reducing the shear stresses on the flexible elongate rings made of a textile material.

The connecting elements being made of an electrically-conductive material, they provide electrical continuity along the central column. In one form, these connecting elements are made of an electrically-conductive material maintaining good mechanical characteristics at very high temperature.

In one form, the connecting elements consist of solid parts made of a material selected from graphite, silicon carbide, pre-baked carbon and/or combinations thereof.

Moreover, besides their connecting function, the connecting elements may also serve as an anchor point at the bottom portion of the electrode for cross-linking into a stiff paste the soft carbonaceous paste being molten and baked around the central column within the shroud of the electrode.

During the operation of an electric arc furnace, slipping of the lower portion of the electrode in the shroud might be blocked by excessive adherence of the baked paste on the shroud in the bottom portion of the latter.

During more severe blockages of the electrode in the shroud, it is possible to accept making the shroud itself slip too, if desired, even if that means that a portion of this shroud is consumed in the mixture being molten in the furnace.

Thus, the electrode according to the present disclosure may further comprise a tool for peeling and assisting the descent of the stiff carbonaceous paste in the shroud. In one form, such a tool could be in the form of a conductive paint inside the shroud, or in a form specific to the elements forming the shroud for a perfect nesting before welding, or of sequential movements of a sliding crown of the shroud.

In one form, the present disclosure relates to a device for suspending a central column of an electrode as described hereinabove, comprising:

a fixed support adapted to temporarily support said central column when adding a carbonaceous elongate element to an upper end of said column, and

- a movable support, surmounting said fixed support and linked in vertical translation to said fixed support by a system of hydraulic cylinders, said movable support being adapted to translate from a high position, in which said hydraulic cylinders are deployed and a carbonaceous elongate element forming the lower end of said central column has not been consumed in the electric arc furnace, to a low position, in which said hydraulic cylinders are retracted and said carbonaceous elongate element forming the lower end of said central column has been consumed,
- where said fixed support is provided with a horizontal bearing surface linked in vertical translation to said fixed support, between a high position, in which said bearing surface receives a connecting element of a top portion of said central column so that the portion of the central column located below said connecting element of said top portion of the central column is supported by said bearing surface, and a low position, in which said bearing surface does not receive any connecting element and does not support any portion of the central column.

The device according to the present disclosure has a simple design and enables an operation of adding, also called joining, a carbonaceous elongate element to the upper end of the central column that is simple to complete.

Indeed, according to the device according to the present disclosure, all it needs is to make the connecting element of a top portion of the central column rest on the bearing surface so as to allow proceeding with joining. The operation does not require complex steps, such as steps of screwing threaded fittings or tightening with clamps according to a particular tightening force to comply with.

In a form of the present disclosure, said bearing surface is linked in vertical translation to said fixed support by a system of hydraulic cylinders. Thus, the translation of the bearing surface is monitored and provided.

In an form of the present disclosure, said bearing surface comprising a central orifice sized so as to receive the carbonaceous elongate elements and the connecting elements of said central column, said device further comprises a removable blocking part that could be positioned under said connecting element of a top portion of said central column, said blocking part being sized so as to inhibit said connecting element of a top portion of said central column from passing throughout said central orifice when said bearing surface is in the high position. Thus, the joining operation simply requires positioning the blocking part under the connecting element of a top portion of said central column during hooking of a new carbonaceous elongate element to the upper end of the central column, and then removing it once joining is completed.

In one form, the stroke of the hydraulic cylinders linking the movable support to the fixed support is substantially longer than a length defined by two carbonaceous elongate elements of said central column placed end-to-end. Such a length allows joining a new carbonaceous elongate element easily to the upper end of the central column.

In one form, the present disclosure relates to a method for joining a carbonaceous elongate element to the upper end of a central column of an electrode as described hereinabove by means of a device as described hereinabove, the method comprises the following steps:

A) on completion of consumption of the carbonaceous elongate element forming the lower end of the central column, while the entirety of the central column is supported by hooking of the carbonaceous elongate element forming the upper end of the central column to the movable support which translates towards the low position, the first connecting element of the central column coming from the upper end of said central column is let to bear on the bearing surface blocked in the high position, B) once bearing of the first connecting element of the central column is completed on the bearing surface blocked in the high position, the portion of the central column located below said first connecting element is supported by the fixed support, and the portion of the central column located above said first connecting element is relaxed, C) the carbonaceous elongate element forming the upper end of the central column is then pulled off the movable support, D) a connecting element and a new carbonaceous elongate element that becomes, in turn, the carbonaceous elongate element forming the upper end of the central column, is installed on the carbonaceous elongate element that has been pulled off, E) the newly installed carbonaceous elongate element is hooked to the movable support, F) the movable support is translated towards its high position so as to tension the entirety of the central column so that the entirety of the central column is supported again by the movable support, G) the bearing surface is unlocked from its high position and is translated towards its low position so as to release said first connecting element that it was carrying.

In one form, where the bearing surface comprises a central orifice sized so as to receive the carbonaceous elongate elements and the connecting elements of said central column, and where the device further comprises a removable blocking part that could be positioned as described hereinabove, said blocking part is positioned under the first connecting element prior to step A). Thus, the first connecting element is inhibited from passing throughout the central orifice, throughout the duration of joining, when the bearing surface is blocked in the high position. When the entirety of the central column is supported again by the movable support as described at step F) and the bearing surface is brought back to its low position as described at step G), the blocking part is removed from said first connecting element that said bearing surface was carrying and said blocking part is positioned under adjacent upper connecting element. Meanwhile, this upper adjacent connecting element has become the first connecting element starting from the upper end of the central column. This operation is repeated at each joining operation, according to the needs for lengthening the central column induced by the consumption of the electrode.

Thus, it arises that thanks to the electrode and to the device according to the present disclosure, the method for joining a new carbonaceous elongate element to the upper end of the central column is particularly easy and does not require any complex screwing and/or tightening steps according to particular forces.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
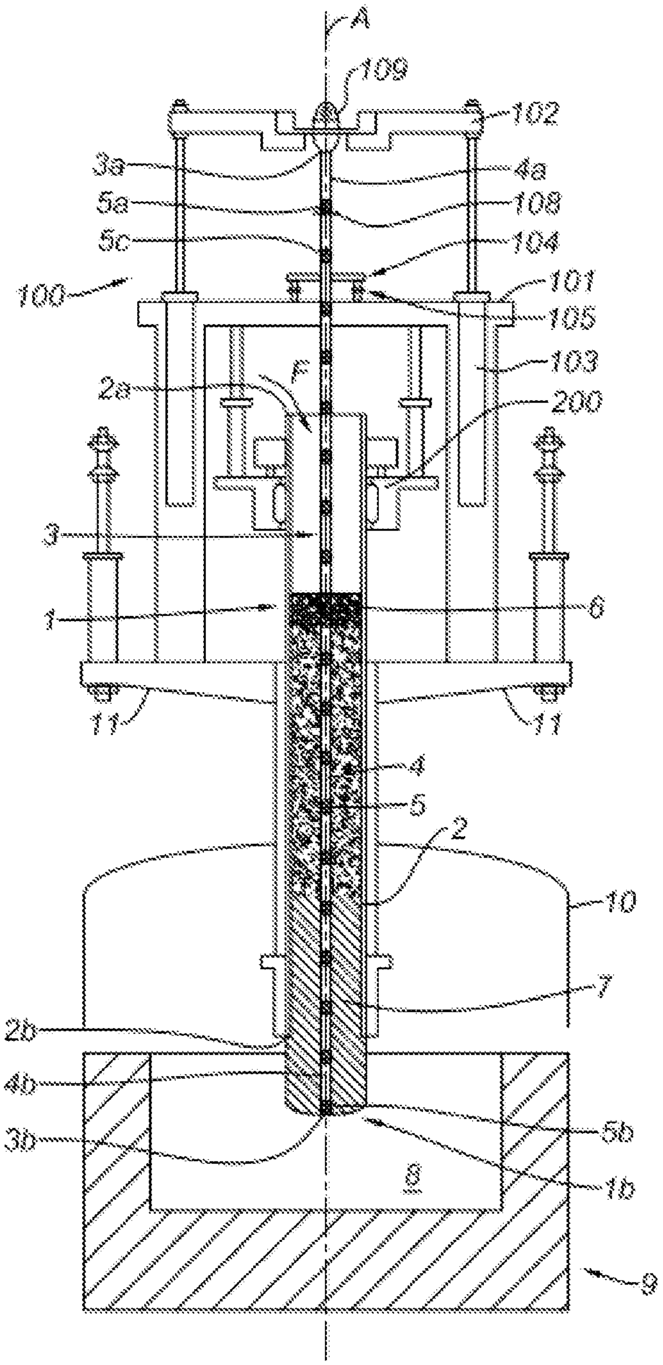
FIG. 1 is a sectional view of an electrode of a device in position in an electric arc furnace, according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a self-baking electrode for an electric arc furnace, including a central column adapted to be suspended, wherein the central column is designed to reduce the risks of break-up caused by lateral forces induced on a lower end of the self-baking electrode by a rotation of the vat of the arc furnace or the regulating movements of the electrode.

Referring to FIG. 1, a self-baking electrode 1 according to the present disclosure for the production of metals in an electric arc furnace is represented.

The electrode 1 comprises a cylindrical shroud 2, aligned according to a longitudinal axis A which is also the longitudinal axis of the electrode 1. The shroud 2 is made of an electrically-conductive material. In general, the shroud 2 is made of steel. The shroud 2 comprises an open upper end 2*a* and a lower end 2*b* also open.

The electrode 1 also comprises a central column 3 disposed within the shroud 2. The central column 3 is also aligned on the longitudinal axis A, concentrically with the shroud 2. As shown in FIG. 1, the central column 3 extends over a length longer than that of the shroud 2 and has an upper end 3*a* and a lower end 3*b*.

The central column 3 is suspended by its upper end 3*a* from a device 100 that will be described later on.

The central column 3 is composed by a series of electrically-conductive carbonaceous elongate elements 4, connected together by connecting elements 5, also electrically-conductive.

In the space comprised between the central column 3 and the wall of the shroud 2, there is a carbonaceous paste. According to the known principle of self-baking electrodes, the carbonaceous paste is introduced into the shroud 2 through its upper end 2*a*, in one form as indicated in FIG. 1 by the arrow F, in a crude form. The crude paste 6 softens with the temperature rise during its progressive descent in the shroud 2. The crude paste 6 switches from the liquid state under the effect of heat, and it progressively bakes and cross-links into a stiff paste 7 in the bottom portion of the electrode 1, while sticking to the central column 3. In its baked and stiff form, the carbonaceous paste 7 is electrically-conductive.

Thus, the lower end 1*b* of the electrode 1 is made by both the lower end 3*b* of the central column and of stiff carbonaceous paste 7.

As shown in FIG. 1, the electrode 1 is disposed vertically on top of the vat 8 of a furnace 9. The furnace 9 is lined with refractory materials. The vat 8 is loaded with mixtures of metallic oxides and carbonaceous reducers (not represented in FIG. 1). The vat 8 is a rotary vat. The furnace 9 comprises a fume hood 10.

The electrode 1 crosses the fume hood 10 so that the top portion of the electrode 1 is located outside the active and hot portion of the furnace 9, while the lower end 1*b* of the electrode 1 is located in the furnace 9, immersed into the magmatic mixture of metallic oxides and carbonaceous reducers.

Current conveyor plates 11 are connected to the electrode 1 and allow powering up the electrode 1.

In operation, the thermal energy of the electric arc established between the lower end 1*b* of the electrode 1 and the metal layer at the bottom of the vat 8 allows reaching a temperature high enough to produce the liquid metal by carbothermic reduction of its oxides. The molten metal is concentrated in a liquid layer at the bottom of the vat 8 from which it is evacuated, in one form by an overflow system (not represented in FIG. 1).

The operation of the electric arc furnace implies the consumption of the lower end 1*b* of the electrode 1. Thus, during the continuous production of the metal, the elongate element forming the lower end 3*b* of the central column 3, hereinafter called last elongate element 4*b*, is consumed. In the same manner, the connecting element located at the lower end 3*b* of the central column, hereinafter called last connecting element 5*b*, is also consumed.

According to the principle of self-baking electrodes, the central column 3 is adapted to slip within the shroud 2, so that only the last carbonaceous elongate elements 4*b* and connecting elements 5*b* of the stiff carbonaceous paste 7 are consumed in the molten mixture in the vat 8 progressively with the production of the metal, while the steel-made shroud 2 remains away from said mixture. Thus, the molten mixture in the vat 8 is not contaminated by iron that would originate from the dissolution of the shroud 2.

As it will arise from the description of FIG. 4 hereinbelow, as the last carbonaceous elongate element 4*b* and the last connecting element 5*b* are consumed, a new carbonaceous elongate element 4 and a new connecting element 5 could be added at the upper end 3*a* of the central column 3.

In the electrode of FIG. 1, the carbonaceous elongate elements 4 are flexible, in other words they have a flexibility enabling them to be bent without breaking up when lateral forces are applied at their ends. In one form, the longitudinal axis of a carbonaceous elongate element 4 is adapted to curve according to a circle arc that could have a radius of curvature smaller than or equal to about 1 m, in one form smaller than or equal to about 20 cm, in one form smaller than or equal to 10 cm, in one form ranging from about 10 cm to about 5 cm. The flexible nature of the carbonaceous elongate elements 4 confers flexibility on the central column 3 of the electrode 1 according to the present disclosure enabling it to be subjected to lateral forces in its bottom portion without the risk of this column breaking up.

Moreover, in the electrode 1 of FIG. 1, the connecting elements 5 are configured to enable the deflection of a carbonaceous elongate element 4 with respect to the longitudinal axis A by an angle that could range from −10° to +10°. Such connecting elements 5 allow improving the ability of the central column 3 to bend without breaking up when lateral forces are exerted on its lower end 3*b* because of the rotation of the vat 8.

Figure 2:
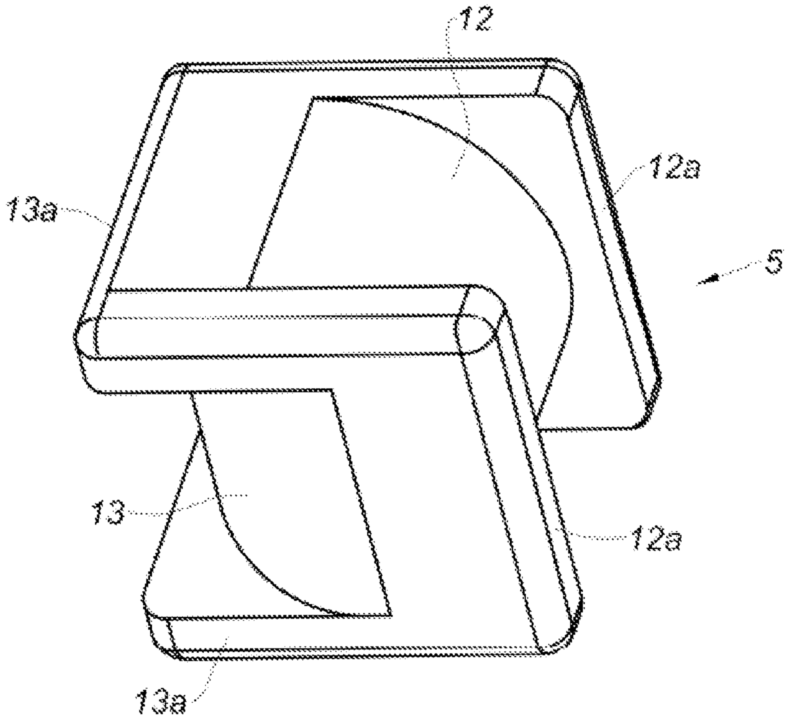
FIG. 2 is a perspective view of a connecting element of the electrode of FIG. 1, according to the teachings of the present disclosure.
Figure 3:
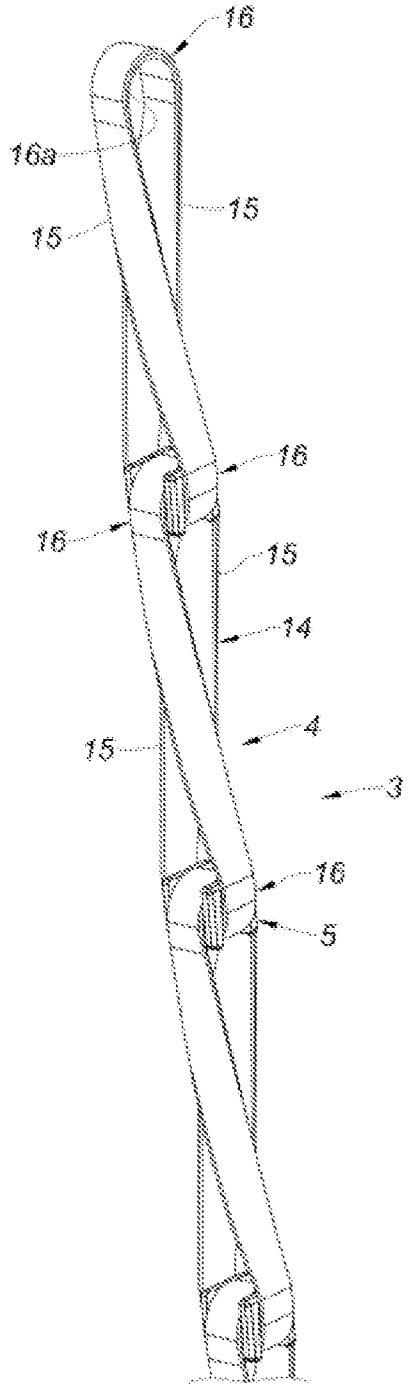
FIG. 3 is a perspective view of a portion of the central column of the electrode of FIG. 1, according to the teachings of the present disclosure.

Referring to FIGS. 2 and 3, the connecting elements 5 and the carbonaceous elongate elements will be described in more detail.

Referring to FIG. 2, a connecting element 5 is represented. The connecting element 5 is in the form of a solid part comprising:

A first convex surface 12, in the form of a portion of a half-cylinder, and

A second convex surface 13, also in the form of a portion of a half-cylinder.

As shown in this figure, the first convex surface 12 and the second convex surface 13 are disposed with respect to one another such that the plane perpendicular to the longitudinal axis of the half-cylinder from which the first convex surface 12 projects is perpendicular to the plane perpendicular to the longitudinal axis of the half-cylinder from which the second convex surface 13 projects.

Moreover, the first convex surface 12 comprises two walls 12*a* perpendicular to the longitudinal axis of the half-cylinder from which it projects, these two walls 12*a* bordering the two ends of the half-cylinder portion forming this first convex surface 12.

Similarly, the second convex surface 13 comprises two walls 13*a* perpendicular to the longitudinal axis of the half-cylinder from which it projects, these two walls 13*a* bordering the two ends of the half-cylinder portion forming this second convex surface 13.

Referring to FIG. 3, a portion of the central column 3 of the electrode of FIG. 1 is represented, comprising the connecting elements 5 described in FIG. 2.

As shown in FIG. 3, the carbonaceous elongate elements 4 are in the form of flexible elongate rings 14. Each ring 14 generally comprises an elongate body, formed by two strips 15, and two generally U-shaped rounded ends 16. In one form, each ring 14 could have a length ranging from 1 to several meters.

Each rounded end 16 has an inner curved surface 16*a*.

The carbonaceous elongate elements 4 may consist of flexible elongate rings 14 made of a textile material. In one form, the flexible elongate rings 14 may be manufactured from straps made of a textile material. In one form, the flexible elongate rings 14 have a sufficient tensile strength to withstand weights that could range from 1 to 40 tons, at temperatures higher than 2000° C.

In one form, the textile material may be formed by carbon fibers.

In another non-represented form, the strips 1 are replaced by ropes made of textile fibers, in one form ropes made of carbon fibers.

Thus, the carbonaceous elongate elements have a great flexibility and are adapted to be bent on themselves without breaking up.

In the represented form, the carbonaceous elongate elements are thus in the form of rings 14 that could be easily bent to associate them together by means of the connecting elements 5. The association of the rings 14 allows constituting a central suspension chain of the electrode. In one form, each chain link of this chain constituted in this manner could have a length of about 1 m.

As shown in FIGS. 2 and 3, the first convex surface 12 of a connecting element 5 is adapted to receive the inner curved surface 16*a* of one end 16 of a first flexible elongate ring 14, whereas the second convex surface 13 of the same connecting element 5 is adapted to receive the inner curved surface of one end 16 of a second flexible elongate ring 14, adjacent to the first flexible elongate ring 14.

Moreover, because of the relative arrangement of the first convex surface 12 and of the second convex surface 13 of said connecting element 5, the inner curved surface 16*a* of the end 16 of the first ring 14 lies in a plane perpendicular to the plane in which lies the inner curved surface 16*a* of the end 16 of the second ring 14, adjacent to the first ring 14.

Thus, the two strips 15 forming the body of a flexible elongate ring 14 perform a 90° torsion of one end 16 of a ring 14 at the other end 16.

As shown in FIG. 3, such connecting elements 5 and such flexible elongate rings 14 enable each ring 14 to change orientation with respect to the general longitudinal axis of the column 3, and therefore deflect with respect to this axis, in one form by an angle ranging from −10° to +10°. In addition, each ring 14 is also adapted to change orientation with respect to each of the two rings 14 to which it is adjacent.

Thus, the flexible nature of the flexible elongate rings 14 and the relative arrangement of these rings 14 and of the connecting elements 5 as described hereinabove confer a great flexibility on the central column 3.

Moreover, the continuity of the column and hooking of the carbonaceous elongate elements, in the form described hereinabove, are also provided: indeed, the perpendicular walls 12*a* bordering the ends of the first convex surface 12 guarantee holding of the inner curved surface 16*a* of the rounded end 16 of the ring 14 within said first convex surface 12. In the same manner, the perpendicular walls 13*a* bordering the ends of the second convex surface 13 guarantee holding of the inner curved surface 16*a* of the rounded end 16 of the ring 14 within said second convex surface 13.

In one form, the solid parts forming the connecting elements 5 are made of an electrically-conductive material maintaining good mechanical characteristics at very high temperature.

In one form, the connecting elements 5 consist of solid parts made of a material selected from graphite, silicon carbides, pre-baked carbon and/or mixtures thereof.

The particular arrangement of the first and second convex surfaces (12, 13) of the solid parts forming the connecting elements 5 allows reducing the shear stresses on the flexible elongate rings 14 made of a textile material.

Moreover, in operation, slipping of the lower portion of the electrode 1 in the shroud 2 might be blocked by excessive adherence of the crude paste 7 on the shroud 2 in the bottom portion of the latter.

In this case, the electrode may further comprise a tool for peeling and assisting the descent of the stiff carbonaceous paste in the shroud, such as in one form a conductive paint inside the shroud, or a specific shape of the elements forming the shroud for a perfect nesting before welding, or sequential movements of a suspension and lengthening crown 200 (see FIG. 1) of the shroud 2.

Figure 4:
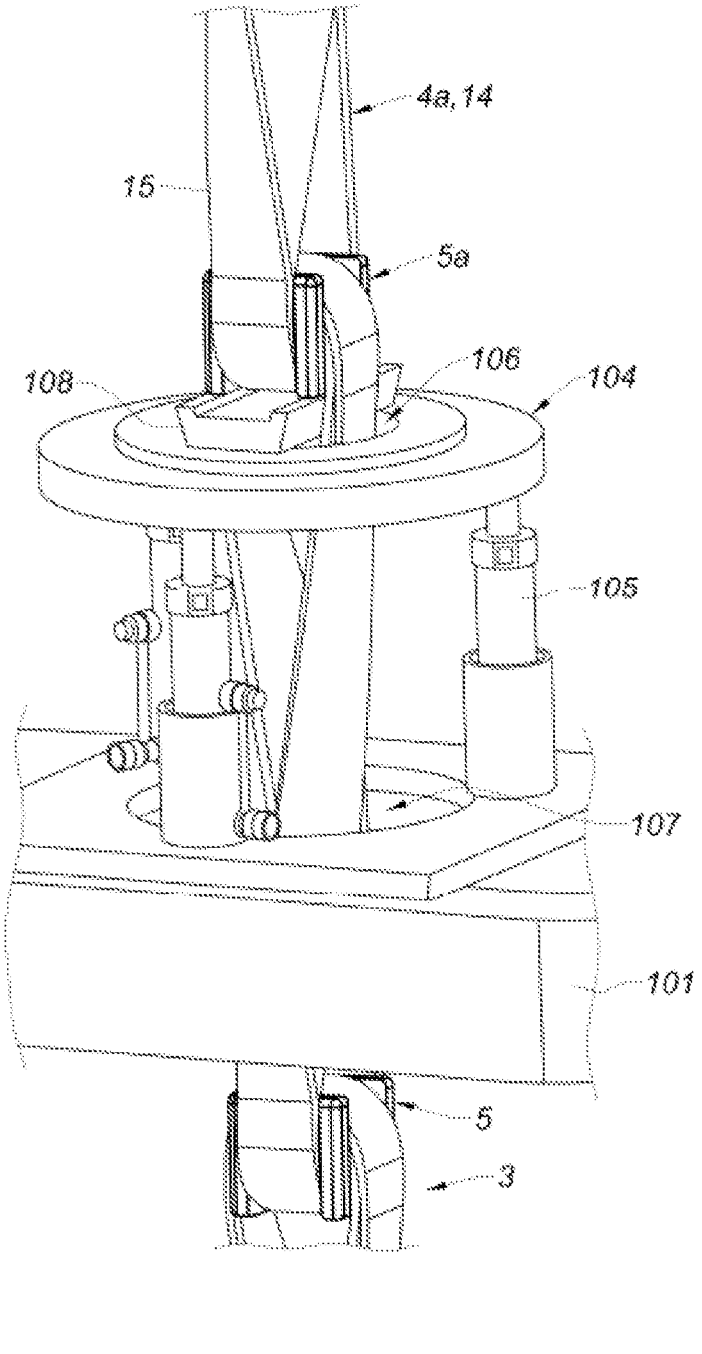
FIG. 4 is a perspective view of the bearing surface of the device of FIG. 1 during a joining step, according to the teachings of the present disclosure.

Referring to FIGS. 1 and 4, the device 100 according to the present disclosure for suspending the central column 3 of the electrode 1 of FIG. 1 will now be described.

The device 100 comprises a fixed support, in the form of a fixed beam 101, and a movable support, in the form of a movable beam 102, linked in vertical translation to the fixed beam 101 by a system of hydraulic cylinders 103.

The movable beam 102 surmounts the fixed beam 101 and is adapted to translate from a high position, in which the hydraulic cylinders 103 are deployed, as shown in FIG. 1, towards a low position (not shown), in which the hydraulic cylinders 103 are retracted.

The fixed beam 101 is topped with a horizontal bearing surface 104 linked in vertical translation relative to said fixed beam 101. In the device 100 represented in FIGS. 1 and 4, the bearing surface 104 is linked to the fixed beam 101 by a system of hydraulic cylinders 105 (three cylinders in the represented forms) and is adapted to translate between a high position, in which the cylinders 105 are deployed, as shown in FIG. 4, and a low position, in which the hydraulic cylinders 105 are retracted, as shown in FIG. 1.

Referring to FIG. 4, the bearing surface 104 comprises a central orifice 106 sized so as to receive the carbonaceous elongate elements 4, in the form of the flexible elongate rings 14 of FIG. 3, and the connecting elements of the central column 3. Moreover, the central orifice 106 of the bearing surface 104 is positioned opposite a circular recess 107 formed in the fixed beam 101, so that the entirety of the central column 3, the flexible elongate rings 14 and the connecting elements 5 cross both the central orifice 106 of the bearing surface 104 and the circular recess 107 of the fixed beam 101.

The device 100 further comprises a blocking part 108, in the form of a rectangular cobble in the represented form. The blocking part 108 is intended to be removably fastened under a connecting element 5, as shown in FIGS. 1 and 4, and is sized so as to inhibit the connecting element 5 to which it is temporarily fastened from crossing the central orifice 106 of the bearing surface 104.

Thus, when the electric arc furnace 9 is operating, the central column 3 is fastened by the carbonaceous elongate element forming its upper end, hereinafter called first carbonaceous elongate element 4*a*, to the movable beam 102 by means of a double hook 109 (see FIG. 1). The blocking part 108 is fastened under the first connecting element of the central column 3 starting from the upper end of the central column, hereinafter called first connecting element 5*a*, as shown in FIG. 1. In this configuration, the entirety of the central column 3 is supported by the movable beam 102.

As the last carbonaceous element 4*b* is consumed in the furnace 9 with the last connecting element 5*b*, the central column 3 being authorized to slip within the shroud 2, the movable beam 102 descends down to its low position, thanks to the hydraulic cylinders 103, which progressively retract.

The first connecting element 5*a* is let to bear on the bearing surface 104, blocked in the high position, via the blocking part 108 fastened thereto, as shown in FIG. 4. The blocking part 108 resting horizontally on the bearing surface 104, above the central orifice 106, it inhibits the first connecting element 5*a* from crossing this central orifice 106.

Once bearing of the first connecting element 5*a* on the bearing surface 104 is completed, the portion of the central column 3 that is located below this first connecting element 5*a* becomes supported by the fixed beam 101, through the bearing surface 104 linked to the fixed beam 101. Consequently, the portion of the central column 3 located above the first connecting element 5*a* is relaxed. The first carbonaceous elongate element 4*a* bends, because of its flexible nature. Thus, the textile material forming the carbonaceous elongate elements 4 in the form of flexible elongate rings 14 naturally allows the rings 14 to bend over themselves.

It is then possible to pull the carbonaceous elongate element 4*a* forming the upper end 3*a* of the central column 3 off the movable beam 102. Because of its flexible nature, it is easily possible to bend the carbonaceous elongate element 4*a* to install at its upper end a new connecting element 5 and a new carbonaceous elongate element 4, which, in turn, becomes the carbonaceous elongate element forming the upper end of the central column 3.

Afterwards, the newly installed carbonaceous elongate element 4 is hooked to the double hook 109 of the movable beam 102. The hydraulic cylinders 103 are deployed again to translate the movable beam 102 towards its high position. Once the movable beam 102 has reached its high position, the entirety of the central column 3 is tensioned again, so that the entirety of the central column 3 becomes supported again by the movable beam 102.

The bearing surface 104 is then unlocked from its high position and translated down to its low position. The blocking part 108 is removed from the first connecting element 5*a* which will then be allowed to cross the central orifice 106 during the subsequent consumption of the electrode 1. The blocking part 108 is then fastened on the upper connecting element 5, which becomes the new first connecting element. This operation of adding a new carbonaceous elongate element, also called joining operation, is repeated each time a carbonaceous elongate element 4 is consumed at the lower end 1*b* of the electrode 1. FIG. 1 shows the central column 3 just after such a joining operation. In this figure, the bearing surface 104 has just been brought into its low position, and the connecting element 5*c* is that one which was bearing on the bearing surface 104 to proceed with the joining operation, and from which the blocking part 108 has just been removed to install it under the newly installed connecting element 5, which has become the first connecting element 5*a*.

In one form, the stroke of the hydraulic cylinders 103 linking the movable beam 102 to the fixed beam 101 is substantially longer than a length defined by two carbonaceous elongate elements 4 of the central column 3 placed end-to-end. Such a stroke of the hydraulic cylinders allows for an easy joining operation as described hereinabove.

In one form, the length of a carbonaceous elongate element may be about 1 m. In one form, the stroke of the hydraulic cylinders 103 may be about 3 m.

The central column of the electrode according to the present disclosure has a flexibility enabling it to be subjected to lateral forces in its bottom portion without the risk of this column breaking up. Thus, the electrode according to the present disclosure could be used in an electric arc furnace to reduce the risks of break-up of the electrode by bending of its suspension column. Thus, the productivity of the furnace is greatly improved.

Moreover, the electrode according to the present disclosure and the suspension device of the central column of the electrode allows joining new carbonaceous elements to the upper end of the central column in a particularly simple manner.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A self-baking electrode for an electric arc furnace, said self-baking electrode comprising:

a substantially cylindrical shroud comprising a longitudinal central axis A, an open upper end, and an open lower end, said shroud being made of an electrically-conductive material and disposed vertically on top of a vat of the furnace over substantially one length of the self-baking electrode;

a central column disposed within the shroud, substantially aligned on the longitudinal axis A, said central column being adapted to be suspended to a device independent of said shroud such that said central column is adapted to slip in vertical translation within the shroud; and a crude carbonaceous paste disposed around the central column in a top portion of said shroud, said paste configured to soften and then bake under an effect of heat into a stiff carbonaceous paste sticking to the central column in a bottom portion of said shroud, wherein said central column comprises a series of electrically-conductive carbonaceous elongate elements, and wherein said carbonaceous elongate elements are bendable by a lateral force applied to a bottom portion of the central column.

2. The self-baking electrode according to claim 1, wherein each carbonaceous elongate element is connected to an adjacent carbonaceous elongate element by an electrically-conductive connecting element configured to enable a deflection of said carbonaceous elongate element with respect to said longitudinal axis A by an angle between −10° to +10°.

3. The self-baking electrode according to claim 2, wherein each carbonaceous elongate element is in a form of a flexible elongate ring, each connecting element comprising a solid part, said solid part being provided with:

a first convex surface adapted to receive an inner curved surface of an end of a first flexible elongate ring, and a second convex surface adapted to receive an inner curved surface of an end of a second flexible elongate ring, adjacent to said first flexible elongate ring.

4. The self-baking electrode according to claim 3, wherein the first convex surface is in a form of a portion of a half-cylinder and said second convex surface is also in a form of a portion of a half-cylinder, the first convex surface and the second convex surface being disposed with respect to one another such that a plane perpendicular to a longitudinal axis of the half-cylinder from which the first convex surface projects is perpendicular to the plane perpendicular to the longitudinal axis of the half-cylinder from which the second convex surface projects.

5. The self-baking electrode according to claim 1, wherein said carbonaceous elongate elements comprise flexible elongate rings made of a textile material.

6. The self-baking electrode according to claim 5, wherein said textile material is formed by carbon fibers.

7. The self-baking electrode according to claim 2, wherein the connecting elements comprise solid parts made of a material selected from the group consisting of graphite, silicon carbide, pre-baked carbon and/or combinations thereof.

8. The self-baking electrode according to claim 1, further comprising a tool for peeling and assisting the descent of the stiff carbonaceous paste in the shroud.

9. A device for suspending a central column of a self-baking electrode according to claim 1, the device comprising:

a fixed support adapted to temporarily support said central column when adding a carbonaceous elongate element to an upper end of said column; and a movable support, surmounting said fixed support and linked in vertical translation to said fixed support by a system of hydraulic cylinders, said movable support being adapted to translate from a high position, in which said hydraulic cylinders are deployed and a carbonaceous elongate element forming the lower end of said central column has not been consumed in the electric arc furnace, to a low position, in which said hydraulic cylinders are retracted and said carbonaceous elongate element forming the lower end of said central column has been consumed, wherein said fixed support is provided with a horizontal bearing surface linked in vertical translation to said fixed support, between a high position, in which said bearing surface receives a connecting element of a top portion of said central column so that the portion of the central column located below said connecting element of said top portion of the central column is supported by said bearing surface, and a low position, in which said bearing surface does not receive any connecting element and does not support any portion of the central column.

10. The device according to claim 9, wherein said bearing surface is linked in translation to said fixed support by a second system of hydraulic cylinders.

11. The device according to claim 9, wherein said bearing surface comprises a central orifice sized so as to receive the carbonaceous elongate elements and the connecting elements of said central column, and said device further comprising:

a removable blocking part positioned under said connecting element of a top portion of said central column, wherein said removable blocking part is sized so as to inhibit said connecting element of a top portion of said central column from passing throughout said central orifice when said bearing surface is in the high position.

12. The device according to claim 9, wherein a stroke of the hydraulic cylinders linking the movable support to the fixed support is substantially longer than a length defined by two carbonaceous elongate elements of said central column placed end-to-end.

13. A method for joining a carbonaceous elongate element to an upper end of a central column of an electrode by means of a device according to claim 9, the method comprising:

A) forming the lower end of the central column on completion of consumption of the carbonaceous elongate element, while an entirety of the central column is supported by hooking of the carbonaceous elongate element forming the upper end of the central column to the movable support which translates towards the low position, a first connecting element of the central column coming from the upper end of said central column is let to bear on the bearing surface blocked in the high position;

B) once bearing of the first connecting element of the central column is completed on the bearing surface blocked in the high position, the portion of the central column located below said first connecting element is supported by the fixed support, and the portion of the central column located above said first connecting element is relaxed;

C) the carbonaceous elongate element forming the upper end of the central column is then pulled off the movable support;

D) a connecting element and a new carbonaceous elongate element that becomes, in turn, the carbonaceous elongate element forming the upper end of the central column, is installed on the carbonaceous elongate element that has been pulled off;

E) hooking a newly installed carbonaceous elongate element to the movable support;

F) translating the movable support towards its high position so as to tension the entirety of the central column so that the entirety of the central column is supported again by the movable support; and G) unlocking the bearing surface from its high position and is translated towards its low position so as to release said first connecting element that it was carrying.

14. The method according to claim 13, wherein prior to step A), a blocking part is positioned under the first connecting element.

15. The method according to claim 14, wherein when the entirety of the central column is supported again by the movable support at step F) and the bearing surface is brought back to its low position at step G), the blocking part is removed from said first connecting element that said bearing surface was carrying and said blocking part is positioned under adjacent upper connecting element.

* * * * *